June 11, 1968     I. C. PORTER     3,387,676
CALORIE COMPUTING WEIGHER
Filed Jan. 6, 1967
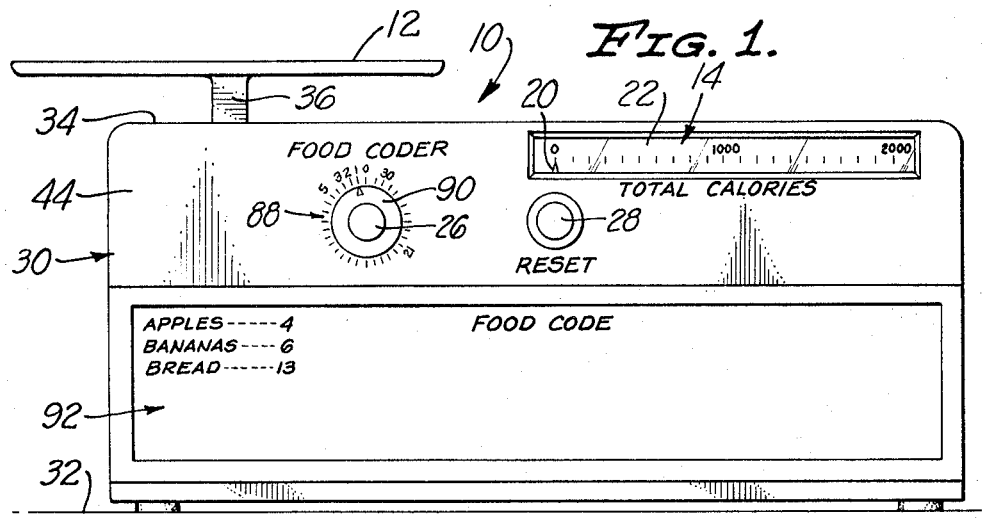
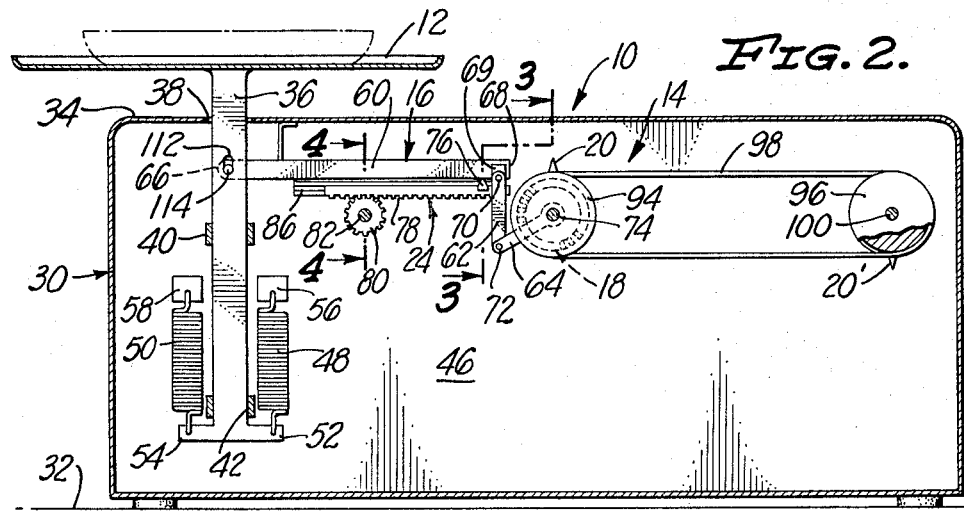
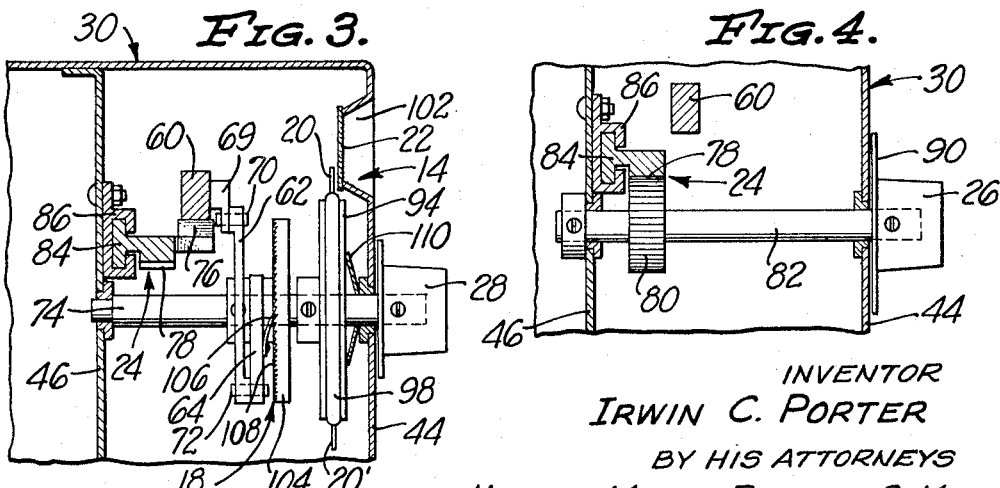
INVENTOR
IRWIN C. PORTER
BY HIS ATTORNEYS
HARRIS, KIECH, RUSSELL & KERN

United States Patent Office 3,387,676
Patented June 11, 1968

3,387,676
CALORIE COMPUTING WEIGHER
Irwin C. Porter, Quinter, Kans. 67752
Filed Jan. 6, 1967, Ser. No. 607,782
4 Claims. (Cl. 177—17)

ABSTRACT OF THE DISCLOSURE

Apparatus for computing the number of calories in food items having presettable means enabling the apparatus to compute the number of calories in different foods and accumulative indicator means for indicating the total number of calories in a series of food items.

---

The present invention relates to apparatus for automatically computing the number of calories in different type food items of different weight and for providing an accumulative indication of the number of calories in a series of food items, such as those to be consumed during a day.

To assist dieters in limiting their daily food intake to a given number of calories, various charts and booklets have been published listing different type foods and the number of calories therein. Usually, the number of calories are given for food portions of different predetermined sizes, such as four-ounce portions of meat and eight-ounce glasses of beverages. Accordingly, for a dieter to be certain of the number of calories he or she is about to consume, each food portion should correspond to or be a multiple of the reference used in the calorie chart or booklet. This requires the dieter to carefully control each food portion either by weight or volume. In most cases, the steps necessary for such control become tedious tasks that are soon neglected by all but the most conscientious of dieters.

Moreover, for food portions which are different from the standard used in the calorie chart or booklet, the dieter must compute the number of calories in the food item. Such computation is annoying for most and rapidly becomes a matter of approximation rather than accurate computation.

On top of all this, the dieter should keep an accurate accumulative record of all calories consumed during each day to be sure that he or she does not exceed the predetermined calorie total for his or her particular diet. This is also an unattractive task which has a tendency to be neglected.

In view of the foregoing, as well as similar problems of record keeping and calories computation, it is an object of the present invention to provide a simple and inexpensive computer which will rapidly, accurately and automatically compute and indicate to a dieter the number of calories in different type food items of different weight, thereby eliminating the requirements that the dieter either careully measure his or her food portions to correspond to the predetermined standard used in the calorie chart or booklet, or, manually compute the number of calories in each portion of food which differs from the standard portion.

Another object of the present invention is to provide a computer of the foregoing character which will automatically provide an indication of the total number of calories in a series of different foods, thereby presenting the dieter with an indication of the total number of calories consumed on a meal-by-meal or daily basis.

A further object of the present invention is to provide an accumulative calorie computer which is selectively adjustable to handle different foods including different numbers of calories per unit of weight.

Still another object of the present invention is to provide a calorie computer which is simple in design, and which merely requires the dieter to place a food item on a weighing pan to produce a visual indication of the number of calories contained therein.

A still further object of the present invention is to provide a computer of the foregoing character which includes an accumulative type indicator connected to the weighing pan to provide an indication of the total number of calories in different food items placed on the pan.

Another object of the present invention is to provide a calorie computer having an accumulative type indicator of the foregoing character which includes a unidirectional drive coupling between the weighing pan and a pointer for moving the pointer in a predetermined direction along a calorie scale with movement of the pan caused by the placement of food items thereon.

The foregoing as well as other features and advantages of the present invention may be more readily understood by reference to the following detailed description when considered with the drawing which, by way of example only, illustrates a form of calorie computer embodying the features of the present invention.

In the drawing:

FIG. 1 is a front view of the calorie computer of the present invention;

FIG. 2 is a sectional front view of the calorie computer of FIG. 1;

FIG. 3 is a fragmentary sectional view taken along the line 3—3 in FIG. 2; and

FIG. 4 is a fragmentary sectional view taken along the line 4—4 in FIG. 2.

In the drawing, the calorie computer is represented by the numeral 10 and, generally speaking, is adapted to separately receive different food items of different weight and to automatically compute and indicate on an accumulative basis the number of calories contained therein.

To accomplish this, the calorie computer 10 basically includes a weighing pan 12 and a calorie indicator 14. The weighing pan 12 is adapted to separately receive the food items and to move vertically between an initial or raised position and different lowered or balanced positions corresponding to the weight of the item on the weighing pan. Donward movement of the weighing pan with a food item is transformed by a linkage 16 and a unidirectional drive coupling 18 and causes a pointer 20 to move along a calorie scale 22 to indicate the number of calories in the food item. In this regard, the linkage 16 is under the control of an adjustment mechanism 24 and may be preset on a calorie basis, by turning a knob 26, to move different distances per pound of food item on the weighing pan. Accordingly, the distance moved by the linkage with the weighing pan 12, and hence the distance moved by the pointer 20, may be regulated to conform to the number of calories in different types of food items.

In addition, because of the unidirectional drive coupling 18, the operation of the indicator 14 is cumulative in nature—providing a calorie total for the food items eaten in a meal or during an entire day, as desired. In this regard, the unidirectional drive coupling 18 is engaged or energized to move the pointer 20 only in response to movement of the weighing pan 12 from its initial position to a balanced position for the food item on the weighing pan. While the weighing pan 12 is in the balanced position and returning to its initial position after removal of the food item, the unidirectional drive coupling 18 is disengaged or de-energized and holds the pointer 20 stationary on the scale 22. Thereafter, when a second item is placed on the weighing pan 12, moving the weighing pan to the same or different balanced position, the unidirectional drive coupling 18 is again engaged or energized and moves the pointer 20 to a new location on the scale 22, to indicate the total number of calories in the first and second food items. The foregoing operation is then repeated for each subsequent food item until the number of calories in a meal or the number of calories consumed in a day have been totalled, at which time the indicator 14 may be reset simply by turning a knob 28.

More specifically, the operating mechanism of the calorie computer 10 is confined primarily within a generally rectangular housing 30 adapted for mounting on a bench or table 32. The weighing pan 12 lies in a substantially horizontal plane above the top 34 of the housing 30 with a stem member 36 extending downwardly from a midportion of the pan through an opening 38. Within the housing 30, the stem member 36 is supported for vertical sliding movement through upper and lower bearing members 40 and 42 connected between a front wall 44 of of the housing and a vertical partition 46 which extends the width of the housing. Thus supported, the weighing pan 12 is adapted to separately receive different type food items of different weight and to move downwardly in response thereto toward the top 32 of the housing 30.

Downward movement of the pan 12 however, is resisted by a pair of coil springs 48 and 50 connected at their lower ends to horizontal feet 52 and 54 extending from right and left sides of the stem member 36, and at their upper ends to support blocks 56 and 58 secured to the partition 46. As the weight of the food item acts on the pan 12 to move the pan in a downward direction, the coil springs 48 and 50 are extended and develop upward forces which increase as the springs expand. Downward movement of the pan 12 continues until the upward spring forces equal and balance the downward forces on the pan developed by the food itme. The pan 12 then assumes a balanced position corresponding to the weight of the food item. A different balanced position is assumed by the weighing pan 12 for each food item of different weight.

When the food item is removed from the pan 12, the coil springs 48 and 50, of course, function to return the pan to its initial position above the top of the housing 30.

As previously indicated, downward movement of the pan 12 is transferred by the linkage 16 to the indicator 14 to produce a visual indication of the number of calories in the food item. To accomplish this, the linkage 16 preferably comprises a beam or arm 60, a linkage arm 62 and a ratchet-carrying arm 64. An end 66 of the beam 60 is connected to the vertical stem member 36 while an end 68 is pivotally connected to the upper end of the linkage arm 62. In this regard, the end 68 is forwardly offset from the balance of the beam 60 and includes a downwardly extending leg portion 69. A pin 70 extends through the leg 69 and the upper end of the linkage arm 62 to pivotally connect the arm to the beam 60. The lower end of the linkage arm 62 is pivotally connected by a pin 72 to the ratchet-carrying arm 64 which, in turn, is hinged for vertical swinging movement around a horizontal shaft 74. The shaft 74 extends through the front wall 44 to carry the reset knob 28.

In the linkage 16, the beam 60 is balanced on a fulcrum 76 of the adjustment mechanism 24 for pivoting in a vertical plane about the fulcrum as the weighing pan 12 moves up and down. In particular, as the weighing pan 12 moves downwardly under the influence of a food item, the end 66 of the beam 60 moves downwardly with the stem member 36 while the end 68 moves in an upward direction. As the end 68 moves upwardly, the linkage arm 62 likewise moves in an upward direction causing the ratchet-carrying arm 64 to swing on the shaft 74 in a clockwise direction and, as will be hereinafter described, drive the pointer 20 to the right along the scale 22. As the pan 12 assumes the balanced position for the food item, movement of the beam 60 ceases and the pointer 20 assumes a position on the scale 22 indicative of the number of calories in the food item. Then, as the food item is removed from the pan 12 and the pan is returned to its initial position by the coil springs 48 and 50, the beam 60 pivots in a clockwise direction about the fulcrum 76 causing the linkage arm 62 to move in a downward direction and the ratchet-carrying arm 64 to turn on the shaft 74 in a counterclockwise direction.

It is an important feature of the calorie computer 10 that the upward distance traveled by the end 68 of the beam 60 per pound of the food itme on the pan 12 is directly proportional to the number of calories per pound of the food item. This insures that the indication provided by the pointer 20 on the scale 22 accurately represents the number of calories in the food item. It is also an important feature of the calorie computer 10 that the upward distance traveled by the end 68 of the beam 60 is proportional to the number of calories in any given type food item of any given weight placed upon the pan 12, thereby allowing the calorie computer to accurately indicate the number of calories in different food items of different weight.

Such flexibility is provided by the adjustment mechanism 24 including the fulcrum 76 which is selectively movable along a lower surface of the beam 60. In this regard, the fulcrum 76 is carried by a horizontal rack 78 having a series of teeth in its lowermost surface for mating with a pinion gear 80. The pinion gear 80 is carried by a horizontal shaft 82 which extends through the partition 46 and the front wall 44 of the housing 30 (see FIG. 4). Outside the housing 30, the forward end of the shaft 82 carries the knob 26 for manual turning of the shaft and the pinion gear 80. A slide member 84 is connected to the rear of the rack 78 and rides along a horizontal channel member 86 secured to the vertical partition 46. Accordingly, a turning of the knob 26 causes the slide 84 to move along the channel 86 which, in turn, guides the rack 78 in a horizontal plane to position the fulcrum 76 along the lower surface of the beam 60.

The position of the fulcrum 76 along the beam 60 determines the relationship between the upward distance traveled by the end 68 and the downward distance traveled by the end 66 with the pan 12. For example, the further the fulcrum 76 to the left, that is, the closer the fulcrum to the stem member 36, the greater the upward distance traveled by the end 68 relative to the downward distance traveled by the end 66. Conversely, the closer the fulcrum 76 to the end 68, the shorter the vertical distance moved by the end 68 relative to the end 66 with the pan 12.

In the calorie computer 10, when the fulcrum 76 is at predetermined locations along the beam 60, the upward distances traveled by the end 68 per pound of different food items on the pan 12 are proportional to the number of calories per pound of the food items. This means that with the fulcrum 76 at the predetermined locations along the beam 60, the upward distance traveled by the end 68 is proportional to the number of calories in the food items. For example, in the drawing, the fulcrum 76 is illustrated as being in a far right location in which the upward distance traveled by the end 68 may be proportional to the number of calories in a chicken bouillon soup.

Each predetermined location of the fulcrum 76 along the beam 60, of course, corresponds to a predetermined rotational position of the pinion gear 80 and knob 26 from a reference position—the turning of the knob 26 from the reference position to the predetermined rotational positions moving the fulcrum 76 from its far right or reference position to the predetermined locations for the particular food items involved. Each predetermined rotational position of the knob 26 therefore corresponds to a number of calories per pound in predetermined food items.

In the calories computer 10, the predetermined rotational positions of the knob 26 are numerically represented by numbers from "zero" to "30" on a circular scale 88 around the knob. A pointer-carrying disc 90 is secured to the knob 26 around the shaft 82 and turns therewith to indicate on the scale 88 the particular rotational position of the pinion gears 80 and hence the predetermined location of the fulcrum 76 along the beam 60.

Each numerical representaiton in the scale 88 represents a particular code for all food items having a like number of calories per pound. A chart 92 of the codes for various foods is located on the front wall 44, as illustrated in FIG. 1. For example, apples are associated with the food code "4," bananas with a food code "6," and bread with a food code "13." Other foods, of course, are associated with different predetermined codes.

Accordingly, to determine the number of calories in an apple, for example, the knob 26 is turned to bring the pointer on the disc 90 to the number "4" on the scale 88. The apple is then placed on the the pan 12. Downward movement of the pan 12 produces upward movement of the end 68 of the beam 60 a distance which is proportional to the number of calories in the apple. The upward movement of the end 68 produces a movement of the pointer 20 along the scale 22 to a location which corresponds to the number of calories in the apple.

For each different type food item, the foregoing operation is repeated. That is, the knob 26 is turned to bring the pointer on the disc 90 to the number on the scale 88 corresponding to the food code for particular food item found on the chart 92. Then the food item is placed on the pan 12 to cause the indicator 14 to provide a visual indication of the number of calories in the food item.

As previously indicated, it is an important feature of the calorie computer 10 that the indicator 14 is cumulative. The means that the indicator 14 provides an indication of the total number of calories in food items as they are separately placed on the pan 12.

For example, assume that the dieter's lunch is to consist of an apple, a piece of bread, and a banana, and that the number of calories in the apple have been determined in the manner just described. The apple is then removed from the pan 12 which then returns to its initial position under the influence of the coil springs 48 and 50. The indicator 14, however, is designed such that the pointer 20 remains stationary both while the weighing pan 12 is in its balanced position, and while the pan is returning to its initial position. Accordingly, the indicator continues to provide a visual indication of the number of calories in the apple even though the apple has been removed from the pain.

Prior to placing the piece of bread on the pan, the knob 26 is turned to bring the pointer on the disc 90 to the number "13," corresponding to the food code for bread. The piece of bread is then placed on the pan 12 causing the pan to move downward to a lowered balanced position. Downward movement of the pan 12 again produces an upward movement of the end 68 of the beam 60. This time, due to the repositioning of the fulcrum 76 by the turning of the knob 26, the upward movement of the end 68 is proportional to the number of calories in the piece of bread and produces a movement of the pointer 20 to the right to provide a cumulative indication on the scale 22 of the number of calories in the apple and the piece of bread. The piece of bread is then removed from the pan 12 which with the linkage 16 returns to its initial position. The pointer 20, however, remains stationary providing a cumulative indication of the calories in the apple and the piece of bread.

Next, the knob 26 is turned to bring the pointer on the disc 90 to the numeral "6" corresponding to the food code for bananas. The banana is then placed on the pan and the foregoing operation repeated such that the pointer 20 moves to provide a cumulative indication of the number of calories in the apple, bread, and banana. In this manner, the indicator 14 is adapted to provide a meal-by-meal or day-by-day indication of the total number of calories consumed by the dieter in order that he may stay within a given maximum of calories per meal or day.

To accomplish the foregoing operation, the indicator 14, in addition to the pointer 20 and calorie scale 22, includes a pair of horizontally spaced pulleys 94 and 96 and a continuous belt 98 carrying the pointer 20. The pulley 94 is mounted on the shaft 74 immediately behind the front wall 44 of the housing 30 while the pulley 96 is mounted on a horizontal shaft 100—the shafts 74 and 100 extending between and being supported by bearings on the front wall 44 and the partition 46 (see FIG. 3). The belt 98 extends around the pulleys 94 and 96 and in addition to the pointer 20 carries a similar pointer 20' spaced equally from the pointer 20.

In operation, a turning of the pulley 94 with the shaft 74 produces movement of the belt 98 and a turning of the pulley 96 to move the pointer 20 along the scale 22 from a "0" to a "2000" calorie indication. Continued movement of the belt 98 moves the pointer 20' to a position behind the scale 22 for movement therealong. The scale 22, by the way, comprises a rectangular piece of transparent material secured behind a window 102 in the front wall 44 of the housing 30 and having calorie divisions and numerals marked thereon.

In order for the indicator 14 to provide a cumulative indication of the number of calories in a series of different foods separately placed on the weighing pan 12, it is necessary that the pointer 20 and hence the pulley 94 only turn in one direction in response to movement of the linkage 16. To accomplish this, the calorie computer 10 includes the unidirectional drive coupling unit 18 which, by way of example only, comprises a ratchet wheel 104 and a ratchet arm 106. The ratchet wheel 104 is carried by and secured to the shaft 74 between the pulley 94 and the ratchet-carrying arm 64. The ratchet arm 106 is connected to a forward face of the arm 64 and is adapted to engage a ring of teeth 108 on the rear face of the ratchet wheel.

The teeth 108 and ratchet arm 106 are arranged such that the ratchet arm will move freely over the teeth in a counterclockwise direction. However, clockwise movement of the ratchet arm 106 with the ratchet-carrying arm 64 causes the tip end of the ratchet arm to engage a tooth on the ratchet wheel 104 to produce a clockwise turning of the ratchet wheel and associated shaft 74. The clockwise turning of the shaft produces a like turning of the pulley 94 to drive the belt 98 in a clockwise direction thereby moving the pointer 20 to the right along the calorie scale 22.

Clockwise movement of the ratchet-carrying arm 64 is only produced when the weighing pan 12 is moving in a downward direction. Accordingly, the pointer 20 is only moved in response to downward movement of the weighing pan. Thereafter, while the weighing pan 12 is in a balanced lower position, the pointer 20 of course remains stationary.

While the weighing pan is moving in an upward direction to its initial position, the ratchet-carrying arm 64 moves in a counterclockwise direction. As previously indicated, the ratchet arm 106 moves freely over the ratchet wheel 104 while the ratchet-carrying arm is moving in a counterclockwise direction thereby allowing the pointer 20 to remain stationary indicating the number of calories in the food item just removed from the weighing pan 12. In this regard, an annular spring washer 110 extends around the shaft 74 between the shaft bearing in the front wall 44 and a forward face of the pulley 94 to hold the pulley in place while the ratchet arm 106 is moving in a counterclockwise direction over the teeth of the ratchet wheel 104. This prevents the pointer 20 from accidentally moving to the left to change the cumulative indication on the calorie scale 22.

Placement of the next food item on the weighing pan 12 again produces clockwise movement of the ratchet-carrying arm 64 to again turn the ratchet wheel 104 and the pulley 94 and drive the pointer 94 and drive the pointer 20 further to the right along the calorie scale 22. In this manner, the unidirectional drive coupling unit 18 is responsive only to upward movement of the end 68 of the beam 60 and drives the pointer 20 in one direction only along the scale 22 to provide a cumulative indication of the number of calories in a series of different food items separately placed on the weighing pan 12.

Certain food items such as liquids cannot be placed directly on the weighing pan 12 but rather must be held in a container such as a dish or glass. Compensation must be made for the weight of the dish or glass in such instances. In the calorie computer 10, compensation is automatically made for a predetermined weight dish, or glass, which may be provided with the calorie computer. This is accomplished by means of a loose connection between the end 66 of the beam 60 and the stem member 36 extending from the weighing pan 12. The loose connection comprises a vertically elongated slot 112 in the stem member 36 and a horizontal pin 114 extending from the end portion 66 of the beam 60. The length of the slot 112 is such that the predetermined weight of the standard dish or glass moves the weighing pan 12 downward until the upper end of the slot 112 just engages the top of the pin 114 without moving the linkage 16. Thus, the weight of the standard glass or dish is automatically compensated for in the calorie computer 10.

If it is desired to utilize a dish or glass of different weight, it is necessary to place a small weight equal to the standard dish on the pan 12 to bring the pin 114 to the top of the slot 112. Thereafter, the knob 26 is turned to a "zero" setting to bring the fulcrum 76 to a position directly in line with the pin 70, and the dish or glass for holding the food item then placed on the weighing pan 12. The knob 26 is then turned to the food code for the food item and the food item added to the dish or glass on the pan 12 to cause the computer 10 to provide an indication of the number of calories therein.

At the end of a given meal, or at the end of each day, the indicator 14 is reset to zero simply by manually turning the knob 28 in a clockwise direction. The turning of the knob 28 in a clockwise direction produces a clockwise turning of the shaft 74, and pulleys 94 and 96 to turn the belt 98 is a clockwise direction. Turning of the knob 28 is continued until one of the pointers 20 or 20' is positioned behind the zero mark on the calorie scale 22.

From the foregoing description, it is appreciated that the present invention provides a computer which will rapidly, accurately, and automatically compute and indicate to a dieter the number of calories in different type food items of different weight. The calorie computer thereby eliminates the requirement that the dieter either carefully measure his or her food portions to correspond to the predetermined reference in a calorie booklet or chart, or, manually compute the number of calories in each food portion which differs from the reference. The calorie computer also provides an accumulative indication of the total number of calories consumed by the dieter on the meal-by-meal or daily basis. This eliminates the requirement that the dieter manually total the calories in each food item consumed during each meal and keep a running total on a daily basis to be sure that he or she does not exceed the maximum alloted for his or her particular diet.

While a particular form of calorie computer has been described in some detail herein, changes and modifications may be made in the illustrated form without departing from the spirit of the invention. Furthermore, while the computer has been described as being particularly useful in providing a visual indication of the number of calories and food items, it may find use any place there is a need to compute a characteristic of an item as a function of its weight and to provide an accumulative indication of such a characteristic for a series of such items. Accordingly, the present invention is to be limited in scope only by the terms of the following claims.

I claim:

1. An accumulative computer device comprising: an article support mounted for vertical movement under the influence of the weight of an article thereon; resilient means arranged to exert an upward force directly on said support to balance the weight of an article thereon; an accumulative indicator, one-way drive means drivingly connecting said support to said indicator for advancing said indicator only upon downward movement of said support and including selectively adjustable means for changing the drive ratio between said support and indicator whereby a predetermined downward movement of said support will advance said indicator a preselected amount.

2. A device as defined in claim 1 wherein said drive means comprises a lever having a first pivotal connection to said support and a second pivotal connection to said indicator; said selectively adjustable means comprising a fulcrum member slidably engaging said lever between said pivotal connections and means mounting said fulcrum for movement along said lever to a position in axial alignment with said second pivotal connection whereby a tare weight may be placed on said support without advancing said indicator.

3. A device as defined in claim 1 wherein said indicator comprises a substantially rectilinear scale; an endless belt trained over a pair of spaced pulleys nad having one run extending along said scale; and at least one pointer on said belt cooperating with said scale; said drive means including a pawl and ratchet device for rotating one of said pulleys in only one direction; and manually operable means for rotating said one pulley in said one direction, independently of operation of said drive means, for resetting said indicator.

4. A device as defined in claim 3 wherein said belt is provided with at least two pointers thereon, spaced apart a distance at least equal to the length of said scale.

References Cited
UNITED STATES PATENTS

| | | | |
|---|---|---|---|
| 107,286 | 9/1870 | Paddock | 177—17 |
| 247,761 | 10/1881 | Hopkins | 177—175 X |
| 515,953 | 3/1894 | Dickson | 177—17 |
| 617,725 | 1/1899 | Englen | 177—175 |
| 638,596 | 12/1899 | Reisert | 177—17 |
| 723,659 | 3/1903 | Englen | 177—175 |
| 776,364 | 11/1904 | Sonnichsen | 177—17 |
| 1,764,274 | 6/1930 | Mittendorf | 177—175 XR |
| 2,314,387 | 3/1943 | Carlsson | 177—34 X |
| 2,707,592 | 5/1955 | Rice | 235—78 |

FOREIGN PATENTS

| | | |
|---|---|---|
| 144,226 | 5/1920 | Great Britain. |

ROBERT S. WARD, JR., *Primary Examiner.*